May 4, 1965 J. H. BIRMAN 3,181,629
APPARATUS FOR GEOTHERMAL PROSPECTING
Filed July 23, 1962
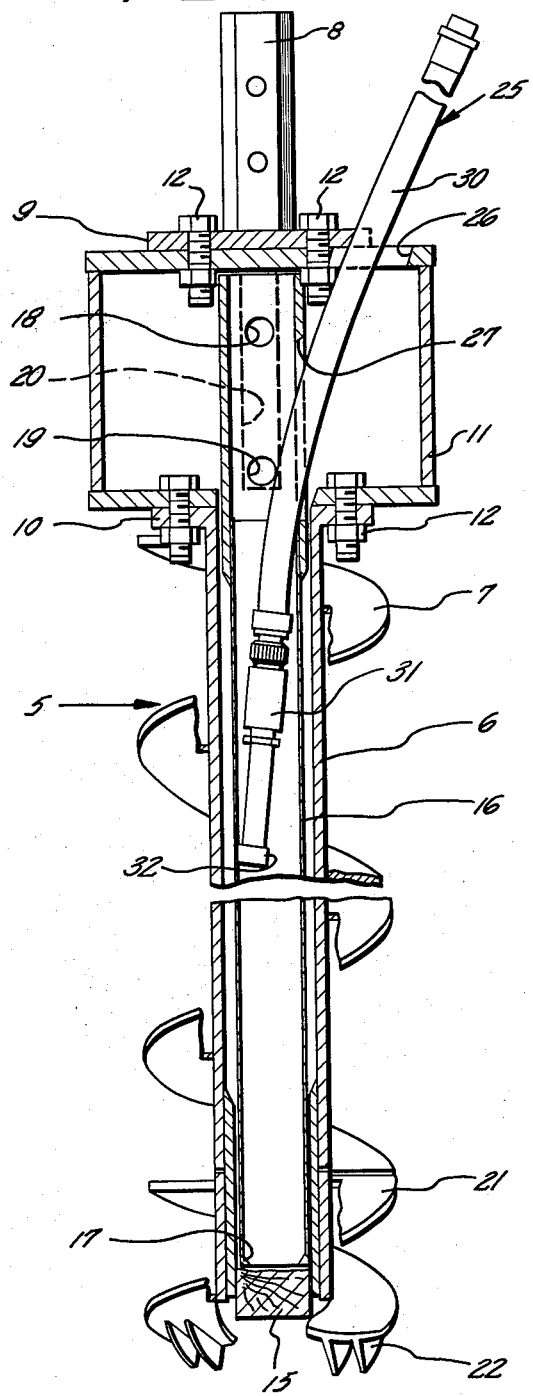
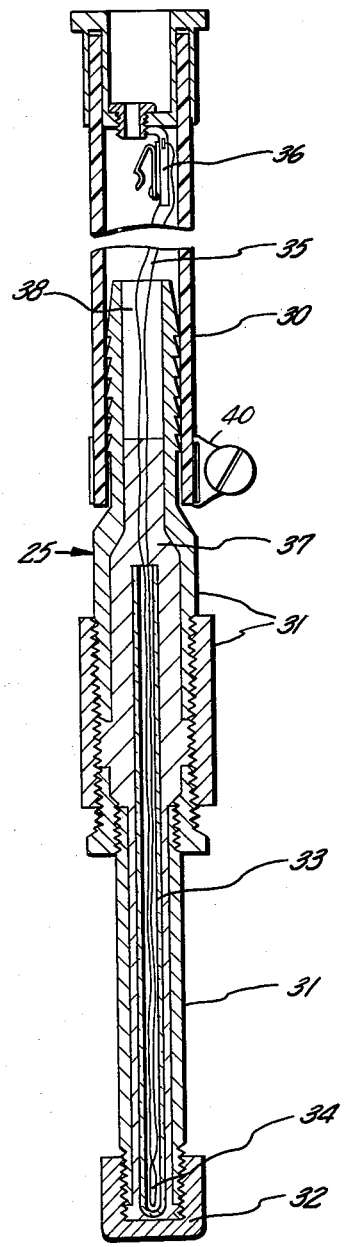
INVENTOR.
JOSEPH H. BIRMAN
BY Christie, Parker & Hale
ATTORNEYS.

United States Patent Office 3,181,629
Patented May 4, 1965

3,181,629
APPARATUS FOR GEOTHERMAL PROSPECTING
Joseph H. Birman, 5327 Ellenwood Drive,
Los Angeles, Calif.
Filed July 23, 1962, Ser. No. 211,765
8 Claims. (Cl. 175—40)

This invention relates to geothermal prospecting, by which is meant the use of sub-surface temperature measurements in earth prospecting, and particularly to an apparatus for obtaining sub-surface temperature measurements.

It is known that certain bodies of mineral, fluids, or rock masses beneath the earth's surface, are possessed of anomalous thermal characteristics, and may be detected by systems of accurate measurement of sub-surface temperatures. Regardless of the particular method of geothermal propspecting being employed, it is essential that accurate sub-surface temperature readings be obtained. In one method of such prospecting, seasonally induced temperature variations are utilized as an aid to the determination of the desired information.

Many problems arise in attempting to obtain accurate sub-surface temperature measurements. It will be realized that any disturbance of the natural environment surrounding the temperature-measuring device may adversely affect the results. High accuracy, therefore, requires that the temperature-measuring device be inserted under the surface with minimal disturbance of natural environment. Since in certain prospecting methods, the desired depth for temperature-taking may be 10 feet or more, it becomes difficult to get a delicate device to such a depth without considerable excavation, especially in loose, sandy soils wherein a hole of large diameter would be required to prevent caving-in of the sides. After such excavation, it is apparent that the natural environment will have been considerably disturbed over a substantially large area surrounding the device, and due to changes in the density of soil packing and the like, thermal characteristics may be altered.

It is a further problem in such measurements that the measuring device must often be left in place for some time in order to obtain a succession of readings. Obvious excavation invites passers-by and vandals to look over the area, thereby frequently discovering the apparatus and innocently, or deliberately, causing harm thereto.

This invention overcomes the foregoing problems, and others, and provides an apparatus for inserting a temperature-measuring device into the earth without substantial excavation or disturbance to the natural environment, together with a novel temperature probe as a part of such apparatus which is especially well suited to earth temperature measurement. It is a further advantage of the apparatus according to this invention that a plurality of insertions may be made in various locations in such a manner that such change as is made to the natural environment is substantially identical at each insertion location, in order that results from different locations may be accurately compared.

Briefly, this invention provides an auger for boring into the earth to a predetermined depth. The auger has a hollow cylindrical stem and an auger blade wound around the stem. A plug is removably engaged in the lower end of the stem so as to close the stem. A selectively operable plug knockout means is carried in the stem of the auger and is movable relative to the stem to engage the plug and to dislodge the plug from the stem. The auger blade at the lower end of the stem defines means for cutting through the earth and coupling means are provided at the upper end of the auger. The coupling means are adapted for engagement with a mechanism for rotating the auger to cause the auger to drill a hole in the earth. The coupling means above the upper end of the auger blade has an opening from the exterior of the auger into the interior of the stem. This opening is provided so that an elongated temperature probe can be inserted into the auger and into a hole formed in to the earth by the auger. The temperature probe preferably is made from a flexible material in part, in order to aid in insertion into the auger stem, and provides a calibrated resistance temperature sensing element enclosed within packing material arranged so that conditions within the probe are held in equilibrium with the natural environment as closely as is possible.

This invention will be more clearly understood with reference to the following description and the accompanying drawings, in which:

FIG. 1 is a cross-section view of an apparatus for obtaining sub-surface temperature measurements according to the present invention; and FIG. 2 is an enlarged cross-section view of the temperature probe shown in the apparatus of FIG. 1.

Referring now to the drawings, a tubular auger, indicated generally at 5, is provided with a hollow auger stem 6, and a helical auger blade 7 wound around the stem. The auger 5 is rotatable by the engagement of a drive shaft 8 with a suitable power source (not shown). A pair of drive plates 9 and 10, are separated by a connecting barrel 11, and are secured thereto by a plurality of bolts 12. The auger 5 may be connected to the drive shaft 8 and the auger stem 6, of any desired length, and in practice a length of 10 feet respectively, has been employed. Shaft 8, plates 9 and 10, and barrel 11 comprise coupling means adapted for coupling the auger stem with a mechanism for rotating the auger stem to drill a hole in the earth. In one embodiment, the outer diameter of the auger blade 7 is approximately 6 inches, and the outer diameter of the auger stem is approximately 2½ inches. One of the surprising results attained by use of an auger according to the present invention is the resultant satisfactory earth penetration by an auger having such a comparatively large hollow stem.

A plug 15 is placed at the base of the hollow auger stem 6 in order to prevent soil from entering the stem 6 during earth penetration. The plug 15 is removable, and in practice has been found to be most satisfactorily made from wood. A cylindrical inner sleeve 16 is disposed within the auger stem 6 and is adapted to be slidable therein. The base 17 of the sleeve 16 rests against the plug 15, and is adapted to push the plug 15 out of the base of the auger stem 6 upon downward sliding movement of the sleeve 16.

The upper portion of the sleeve 16 defines a pair of holes 18 and 19 which are adapted to receive a bar (not shown) for selectively locking the sleeve 16 in place in its uppermost position or sliding the sleeve 16 downwardly inside the auger stem 6 to remove the plug 15. The connecting barrel 11 defines a slot, indicated generally at 20, to premit movement of the bar (not shown) while engaged in the holes 18 and 19.

It is a preferred feature of the construction of the auger 5, that the auger blade 7, which may contain a detachable bit portion, indicated generally at 21, adjacent its lower end, extended beneath the base of the auger stem 6 for a sufficient distance to loosen the soil in advance of the progression of the stem. A plurality of scarifier teeth 22 may be provided at the base of the auger blade 7 for assisting in this purpose and in the boring. In the embodiment described above, wherein the auger length is approximately 10 feet, the lowermost portion of the bit 21, including the scarifier teeth 22 extends at least two inches beneath the base of the auger stem 6.

In operation, the drive shaft 8 is rotated to cause the auger 5 to bore into the earth until it has reached just below the predetermined depth at which it is desired to measure earth temperature. The auger is retracted to the predetermined depth. Then the sleeve 16 is moved downwardly to remove the plug 15, which is inserted into a plug-receiving zone produced by drilling below the predetermined depth, as described. Then the temperature probe 25, described in more detail below with reference to FIG. 2, is inserted into the auger stem 6. The connecting barrel 11 and the side of the inner sleeve 16 both define openings indicated at 26 and 27, respectively, adapted to receive the temperature probe 25. Most of the length of the temperature probe 25 is made from flexible tubing 30, in order that the necessary bending may be accomplished for this insertion. The total length of the temperature probe 25 is substantially the same as the predetermined depth, so that after insertion into the auger stem 6 and inner sleeve 16, the lowermost portion of the probe 25 is adjacent the removed plug 15, and the uppermost portion of the probe 25 is substantially level with the ground surface.

The direction of rotation of the auger 5 is then reversed, and it commences to withdraw from the earth. The soil previously loosened by the auger blade 7 and bit 21 begins to fall back into place against the lowermost portion of the temperature probe 25, thereby holding the probe 25 in place as the auger 5 completes its removal operation.

The entire operation results in minimum soil disturbance, only to the extent of the diameter of the auger 5. Only a small amount of soil is actually removed from the hole. It has been found that the top of the temperature probe 25 may then be capped or covered, and few if any visible traces are left to catch the attention of passers-by. Each insertion accomplished in accordance with this invention is substantially identical to every other insertion made with the apparatus, and thus excellent comparisons of results may be made between different temperature checking points.

Turning now to FIG. 2, the temperature probe 25 according to the present invention includes an elongated flexible tube 30, coupled at one end to a rigid tube 31, which may comprise several segments of ordinary pipe threaded together. When the entire probe 25 is approximately ten feet in length, the portion thereof comprising the rigid tube 31 is only approximately six inches in length. The rigid tube 31 communicates at one end with the interior of the flexible tube 30, and the opposite end thereof is closed, as by a pipe cap 32. The flexible tube 30 is connected to rigid tube 31 by a hose clamp 40 or similar mechanism. A glass tube 33 is disposed within a portion of the rigid tube, and has an open end facing the flexible tube, and a closed end adjacent the closed end of the rigid tube 31. A calibrated resistance temperature sensing element, such as a thermistor 34, is disposed within the glass tube 33 adjacent the closed end thereof. Lead wires 35 extend from the sensing element 34 to the end of the flexible tube 30 adjacent the ground surface, and are joined to a suitable connection jack 36.

In order that temperature conditions within the temperature probe 25 will remain in equilibrium with the surrounding soil, and thus will not affect the temperature readings to be attained, suitable filling material is provided within the probe 25. The rigid tube 31 and glass tube 33 are completely filled with a waxy substance, such as paraffin 37, there being paraffin 37 disposed between the sides of the glass tube 33 and the rigid tube 31. The flexible tube 30 is then filled with dry sand 38 up to a point approximately one foot from the end thereof adjacent the ground surface.

In practice, the temperature probe 25 is inserted into the earth as described above, allowed to reach equilibrium with the immediately surrounding formation, and then one or more temperature readings are taken by use of suitable measuring devices (not shown) for a determination of the earth temperature.

I claim:

1. Apparatus for obtaining sub-surface temperature measurements in an earth formation comprising a rotatable auger for drilling a hole of predetermined depth in the earth formation and including an elongated hollow auger stem, a plug removably engaged in the lower end of the stem to close the same, selectively operable plug knock-out means carried by the auger in the stem and movable axially thereof for engaging the plug to dislodge the plug from the stem, a helical auger blade wound around the exterior of the stem and extending from the lower end of the stem therealong over a substantial portion of the length of the stem, means at the lower end of the auger blade for cutting through the earth, coupling means at the upper end of the auger stem adapted for engagement with a mechanism for rotating the auger stem to drill the hole, the coupling means having an opening communicating with the interior of the auger stem, and an elongated flexible temperature probe having a temperature sensing device located in the lower end thereof and a length substantially equal to the depth of the hole, the probe being configured and arranged to pass through the opening in the coupling means and into the interior of the auger stem and downwardly within the stem and out of the lower end of the stem after removal of the plug from the stem to remain in the hole after the auger is withdrawn from the hole, the auger blade being configured relative to the stem to produce a minimum disturbance of the earth formation adjacent the hole and to convey upwardly material severed from the formation by the lower end of the blade as the auger stem is rotated to drill a hole and to redeposit said material in the hole around the probe as the auger stem is rotated to withdraw the auger from the hole.

2. Apparatus according to claim 1 wherein the plug knockout means comprises an elongated hollow sleeve disposed in the stem, the sleeve having an opening adjacent the upper end thereof communicating with the opening into the coupling means through which the probe may be inserted into the interior of the sleeve, means for maintaining the sleeve in a position relative to the stem in which the sleeve is raised from the plug, and means coupled to the sleeve for lowering the sleeve a distance below said position sufficient to cause the lower end of the sleeve to engage the plug and force the plug from closure relation with the stem.

3. Apparatus according to claim 1 wherein the plug knock-out means comprises an elongated hollow sleeve disposed in the auger and having an open lower end and a length greater than the length of the stem, the lower end of the sleeve being disposed in the stem, the sleeve adjacent the upper end thereof having a pair of holes formed therethrough at aligned locations spaced along the sleeve, the coupling means adjacent the upper end of the sleeve having an elongated opening therethrough aligned with the sleeve holes, the sleeve holes each being adapted to receive a member which when engaged in the lower sleeve hole and supported from the lower end of the elongated opening maintains the sleeve out of contact with the plug and which when engaged with the upper sleeve hole through the elongated opening may be moved downwardly in said opening to engage the sleeve with the plug to force the plug out of engagement with the stem, the sleeve adjacent the upper end thereof having an opening therethrough and through which the probe is passed to dispose the probe in the sleeve within the hollow stem.

4. Apparatus according to claim 3 wherein the probe comprises a rigid hollow member at the lower end thereof within which the temperature sensing device is disposed, a flexible hollow body secured at its lower end to the rigid hollow member and carrying at its upper end coupling means adapted to cooperate with a monitoring mechanism for the temperature sensing device, and means extending between the temperature sensing device and the coupling device for operatively connecting the same, the rigid member and the flexible body being dimensioned to pass through the first mentioned opening in the coupling means, the sleeve opening, the sleeve, and the lower end of the stem when the plug is removed therefrom.

5. Apparatus for obtaining sub-surface temperature measurements in an earth formation comprising a rotatable auger for drilling a hole of predetermined depth in the earth formation and including an elongated hollow auger stem having an open lower end and a length at least equal to the predetermined depth of the hole, a plug removably engaged in the lower end of the stem to close the same, a hollow plug knock-out sleeve having an open lower end carried by the auger in the hollow stem and movable in the stem toward the plug to engage and dislodge the plug from the lower end of the stem, a helical auger blade of predetermined constant width radially of the stem wound around the exterior of the stem and extending from the lower end of the stem therealong for a distance substantially equal to the predetermined depth of the hole, the lower end of the blade extending below the lower end of the stem, a plurality of scarifier teeth affixed to the underside of the portion of the blade extended below the lower end of the stem, coupling means at the upper end of the auger stem adapted for engagement with a mechanism for rotating the auger stem, the coupling means above the upper end of the blade and the sleeve having cooperating openings communicating the exterior of the coupling means and the interior of the sleeve, and an elongated flexible temperature probe having a temperature sensing device located in the lower end thereof and a length substantially equal to the predetermined depth of the hole, the sleeve, the cooperating openings in the coupling means and the sleeve and the probe being cooperatively configured and arranged so that the probe is adapted to pass through said cooperating openings and downwardly within the sleeve and out of the lower end of the stem after removal of the plug from the stem by operation of the knock-out sleeve to remain in the hole after the auger is withdrawn from the hole, the auger blade being configured relative to the stem to produce a minimum disturbance of the earth formation adjacent the hole and to convey upwardly material severed from the formation by the lower end of the blade as the auger stem is rotated to drill a hole and to redeposit said material evenly in the hole around the probe as the auger stem is rotated to withdraw the auger from the hole.

6. Apparatus for obtaining sub-surface temperature measurements in an earth formation comprising a rotatable auger for drilling a hole of predetermined depth in the earth formation and including an elongated hollow auger stem, a plug removably engaged in the lower end of the stem to close the same, a selectively operable plug knock-out means carried by the auger in the stem and movable axially thereof for engaging the plug to dislodge the plug from the stem, a helical auger blade wound around the exterior of the stem and extending from the lower end of the stem therealong over a substantial portion of the length of the stem, means at the lower end of the auger blade for cutting through the earth, and coupling means at the upper end of the auger adapted for engagement with a mechanism for rotating the auger to drill the hole, the coupling means above the upper end of the blade having an opening communicating with the interior of the stem, the auger blade being configured relative to the stem to produce a minimum disturbance of the earth formation adjacent the hole and to convey upwardly material severed from the formation by the lower end of the blade as the auger stem is rotated to drill a hole and to redeposit said material in the hole as the auger stem is rotated to withdraw the auger from the hole.

7. Apparatus according to claim 6 wherein the plug knock-out means comprises an elongated hollow sleeve disposed in the auger and having an open lower end and a length greater than the length of the stem, the lower end of the sleeve being disposed in the stem, the sleeve adjacent the upper end thereof having a pair of holes formed therethrough at aligned locations spaced along the sleeve, the coupling means adjacent the upper end of the sleeve having an elongated opening therethrough aligned with the sleeve holes, the sleeve holes each being adapted to receive a member which when engaged in the lower sleeve hole and supported from the lower end of the elongated opening maintains the sleeve out of contact with the plug and which when engaged with the upper sleeve hole through the elongated opening may be moved downwardly in said opening to engage the sleeve with the plug to force the plug out of engagement with the stem, the sleeve adjacent the upper end thereof having an opening therethrough cooperating with the first mentioned opening in the coupling means to communicate the interior of the sleeve with the exterior of the auger.

8. Apparatus for obtaining sub-surface temperature measurements in an earth formation comprising a rotatable auger for drilling a hole of predetermined depth in the earth formation and including an elongated hollow auger stem having an open lower end and a length at least equal to the predetermined depth of the hole, a plug removably engaged in the lower end of the stem to close the same, a hollow plug knock-out sleeve having an open lower end carried by the auger in the hollow stem and movable in the stem toward the plug to engage and dislodge the plug from the lower end of the stem, a helical auger blade of predetermined constant width radially of the stem wound around the exterior of the stem and extending from the lower end of the stem therealong for a distance substantially equal to the predetermined depth of the hole, the lower end of the blade extending below the lower end of the stem, a plurality of scarifier teeth affixed to the underside of the portion of the blade extended below the lower end of the stem, and coupling means at the upper end of the auger stem adapted for engagement with a mechanism for rotating the auger stem to drill the hole, the coupling means above the upper end of the blade and the sleeve having cooperating openings communiucating the exterior of the coupling means and the interior of the sleeve, the auger blade being configured relative to the stem to produce a minimum disturbance of the earth formation adjacent the hole and to convey upwardly material severed from the formation by the lower end of the blade as the stem is rotated to drill a hole and to redeposit said material evenly in the hole as the stem is rotated to withdraw the auger from the hole.

References Cited by the Examiner

UNITED STATES PATENTS

| | | | |
|---|---|---|---|
| 293,271 | 2/84 | Phillips et al. | 175—323 X |
| 2,403,704 | 7/46 | Blau | 73—151 X |
| 2,450,871 | 10/48 | Adair | 73—359 |
| 2,463,427 | 3/49 | Richards | 73—359 |
| 2,793,833 | 5/57 | Daniel | 175—1 X |
| 2,912,225 | 11/59 | Kandle | 175—57 |
| 2,948,514 | 8/60 | Long | 175—67 |

CHARLES E. O'CONNELL, *Primary Examiner.*

BENJAMIN BENDETT, *Examiner.*